(12) United States Patent
Berger et al.

(10) Patent No.: US 12,030,448 B2
(45) Date of Patent: Jul. 9, 2024

(54) BUMPER ARRANGEMENT WITH ADDITIONAL SUPPORT

(71) Applicant: BENTELER AUTOMOBILTECHNIK GMBH, Paderborn (DE)

(72) Inventors: Karl Kristian Berger, Gjovik (NO); Jens Chr. Haker, Gjovik (NO); Christian Handing, Langenberg (DE); Andreas Hitz, Erwitte (DE); Frode Paulsen, Gjovik (NO); Frank Rabe, Hiddenhausen (DE); Odd Perry Sovik, Kolbu (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 17/590,015

(22) Filed: Feb. 1, 2022

(65) Prior Publication Data
US 2022/0242347 A1 Aug. 4, 2022

(30) Foreign Application Priority Data
Feb. 2, 2021 (DE) ...................... 10 2021 102 365.3

(51) Int. Cl.
*B60R 19/18* (2006.01)
*B60R 19/03* (2006.01)
*B60R 19/34* (2006.01)

(52) U.S. Cl.
CPC .............. *B60R 19/18* (2013.01); *B60R 19/03* (2013.01); *B60R 19/34* (2013.01); *B60R 2019/182* (2013.01); *B60R 2019/1826* (2013.01)

(58) Field of Classification Search
CPC ......... B60R 19/18; B60R 19/03; B60R 19/34; B60R 2019/182; B60R 2019/1826;
(Continued)

(56) References Cited

U.S. PATENT DOCUMENTS 8,020,907 B2 * 9/2011 Wibbeke ................. B60R 19/24
293/133
9,079,549 B2 * 7/2015 Krammer ................ B60R 19/12
(Continued)

FOREIGN PATENT DOCUMENTS

DE 102017124590 A1 4/2019
DE 102019112913 A1 11/2020
(Continued)

OTHER PUBLICATIONS

Office Action for German Application No. 10 2021 102 365.3 dated Oct. 1, 2021; 8pp.
(Continued)

*Primary Examiner* — Pinel E Romain
(74) *Attorney, Agent, or Firm* — HAUPTMAN HAM, LLP

(57) ABSTRACT

A bumper arrangement for a motor vehicle, having an upper main cross member, which is able to be coupled via crash boxes to the motor vehicle, and a lower auxiliary cross member, wherein the main cross member and auxiliary cross member are coupled together via vertical struts. The main cross member and/or the auxiliary cross member and/or the vertical element are supported on the crash box and/or on a longitudinal member via at least one additional support element oriented in the direction of the motor vehicle, wherein the support element is configured in one piece and in a single material with the main cross member or the auxiliary cross member or the vertical element.

12 Claims, 20 Drawing Sheets

(58) Field of Classification Search
CPC ............ B60R 2019/1813; B60R 19/12; B60R 2019/1806; B60R 2019/186
USPC .................................................... 293/133, 155
See application file for complete search history.

(56) References Cited

U.S. PATENT DOCUMENTS

| | | | | |
|---|---|---|---|---|
| 10,421,424 | B2 * | 9/2019 | Sabu | B60R 19/34 |
| 11,142,248 | B2 * | 10/2021 | Günther | B62D 21/15 |
| 11,318,900 | B2 * | 5/2022 | Lee | B60R 19/34 |
| 2005/0029821 | A1 * | 2/2005 | Evans | B60D 1/56 |
| | | | | 293/133 |
| 2011/0115241 | A1 * | 5/2011 | Gonin | B60R 19/12 |
| | | | | 293/146 |
| 2015/0336526 | A1 * | 11/2015 | Handing | B60R 19/34 |
| | | | | 293/133 |
| 2015/0343973 | A1 * | 12/2015 | Stoenescu | B60R 19/12 |
| | | | | 293/133 |
| 2022/0009434 | A1 * | 1/2022 | Tiwari | B60R 19/023 |
| 2022/0258684 | A1 * | 8/2022 | Günther | B60R 19/18 |

FOREIGN PATENT DOCUMENTS

| | | | | |
|---|---|---|---|---|
| DE | 102019120327 | A1 * | 1/2021 | ............ B60R 19/12 |
| DE | 202021103263 | U1 | 6/2021 | |
| EP | 2540575 | A2 | 1/2013 | |
| EP | 3858683 | A1 | 8/2021 | |
| FR | 2810941 | A1 * | 1/2002 | ............ B60R 19/18 |
| FR | 3082155 | A1 | 12/2019 | |
| JP | 2006256518 | A * | 9/2006 | |
| WO | 2007011238 | A1 | 1/2007 | |
| WO | 2008107599 | A1 | 9/2008 | |
| WO | WO-2016193935 | A1 * | 12/2016 | ............ B60R 19/18 |

OTHER PUBLICATIONS

European Search Report for European Application No. 22154761.5 dated May 11, 2022; 11pp.
Office Action for Chinese Application No. 2022100628833 mailed Apr. 29, 2024; 16pp.

* cited by examiner

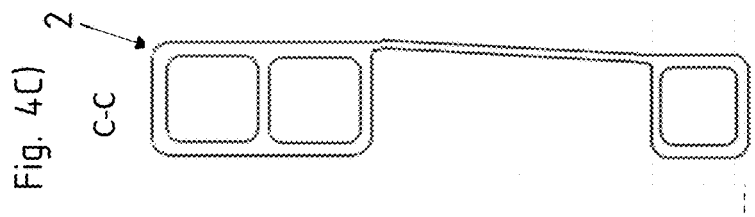
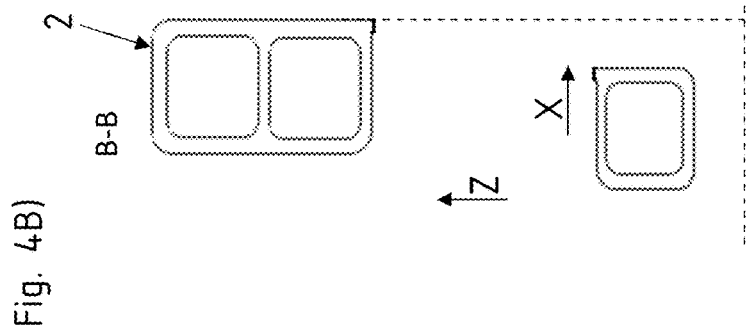
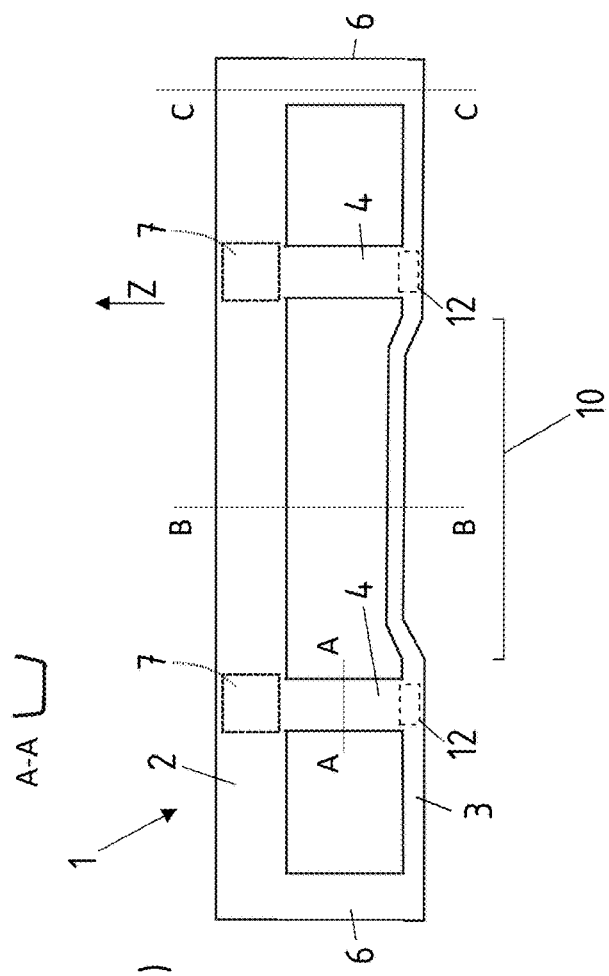

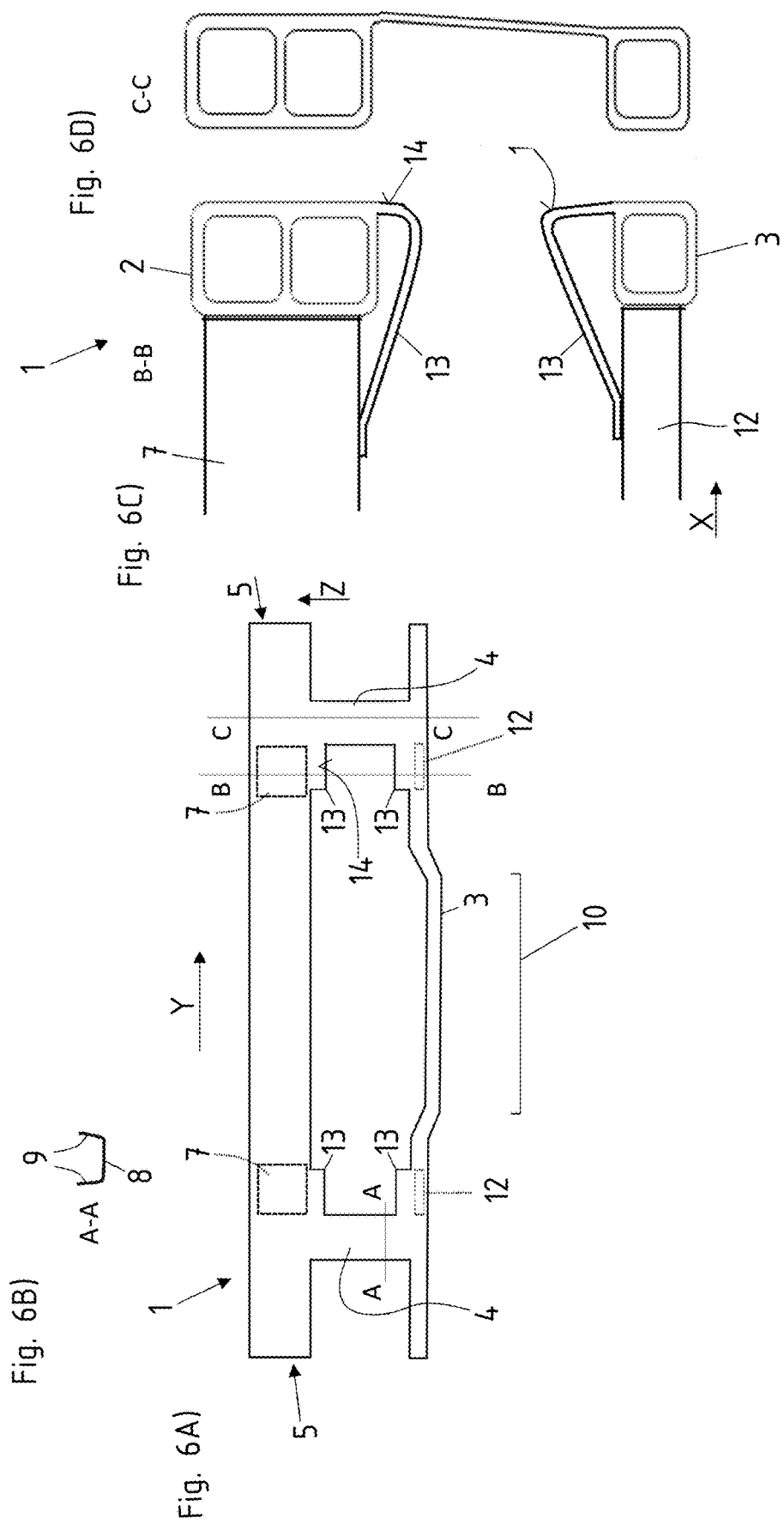

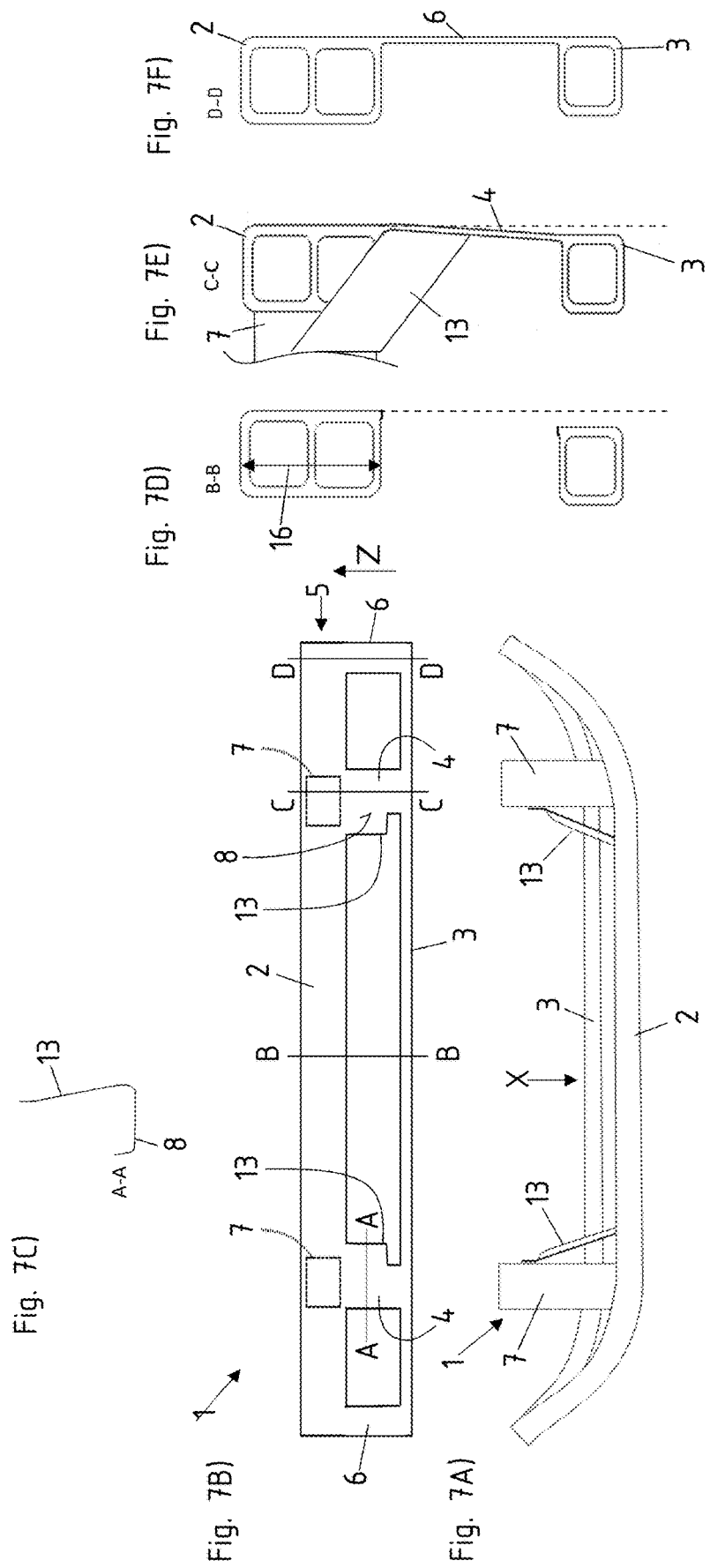

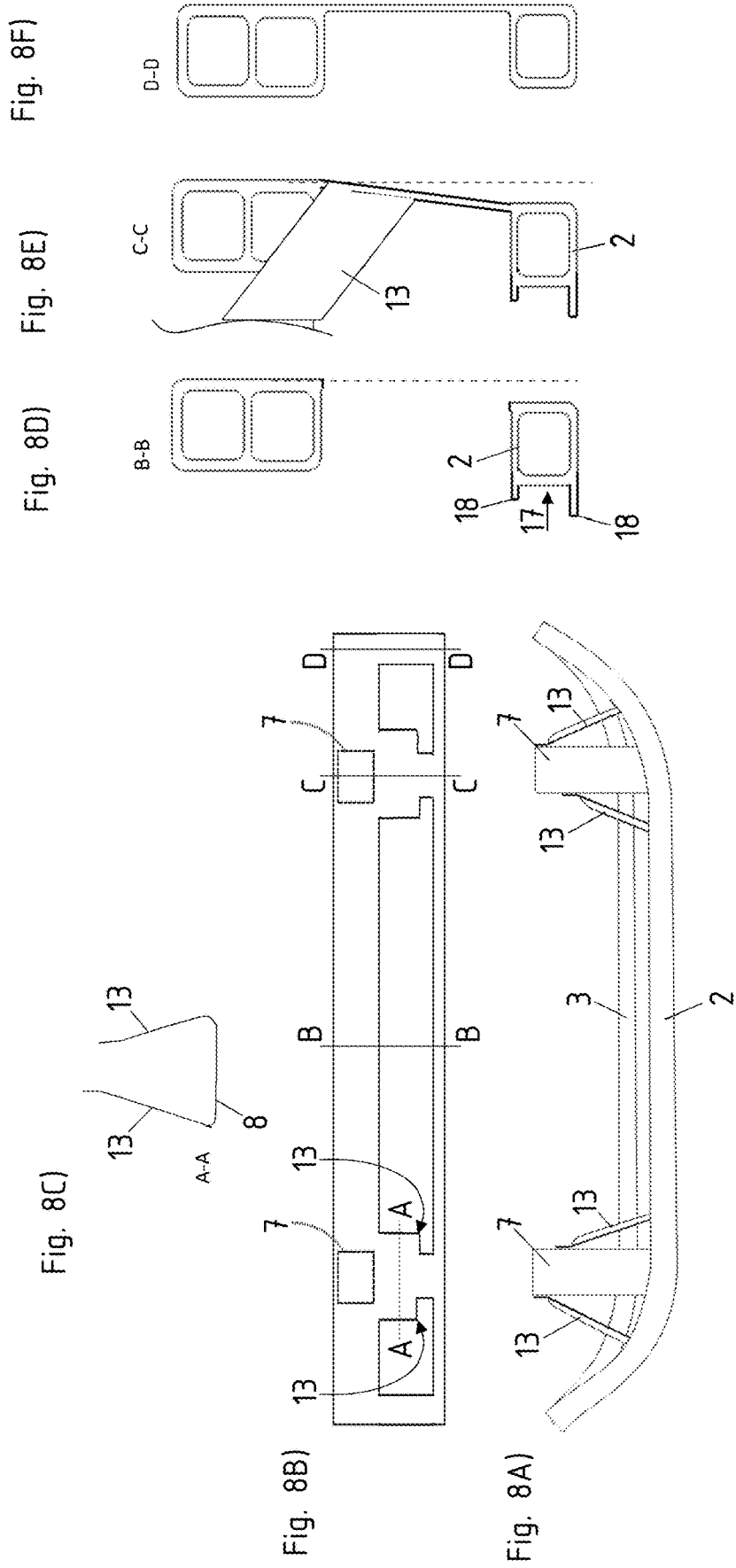

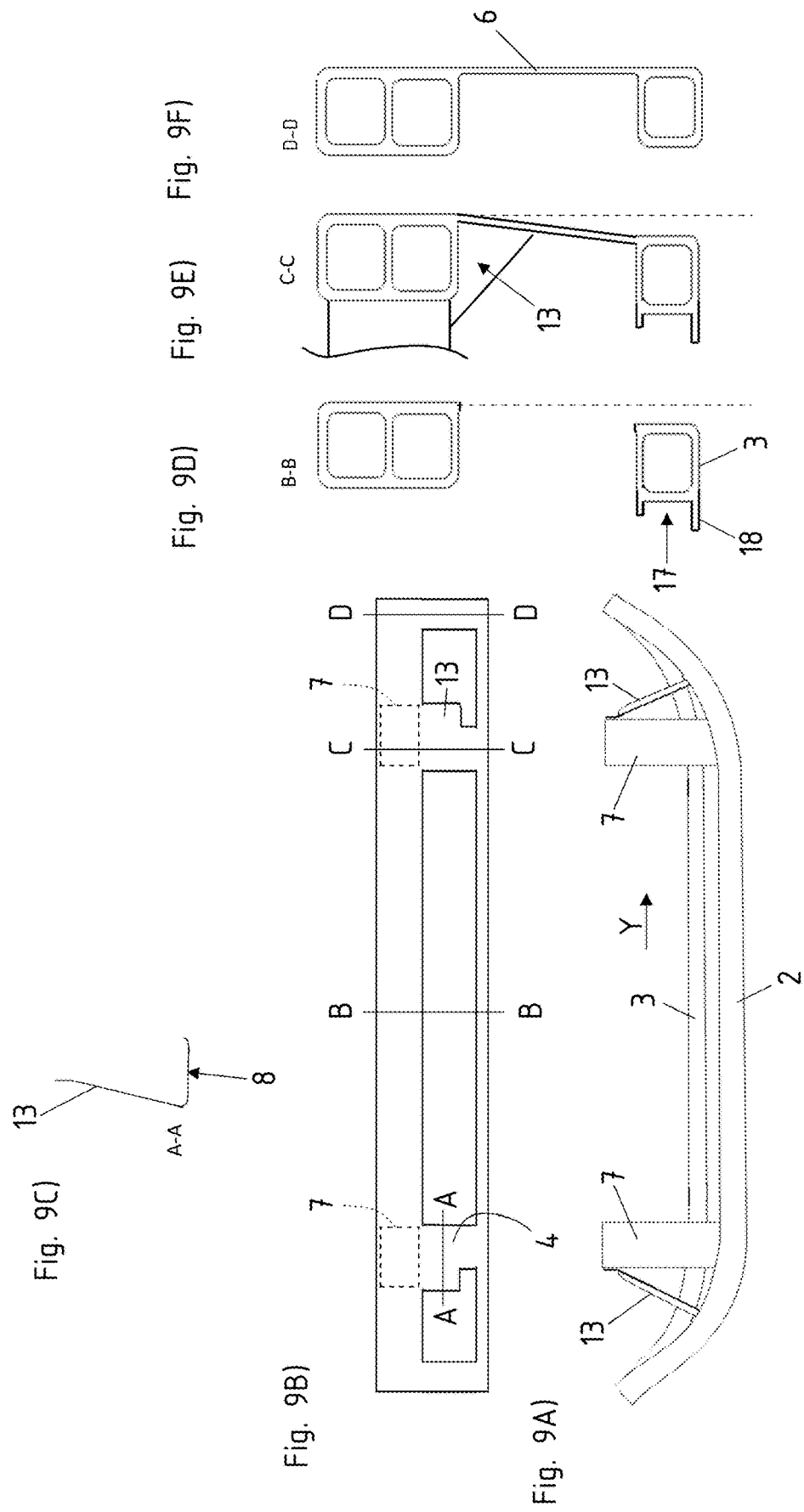

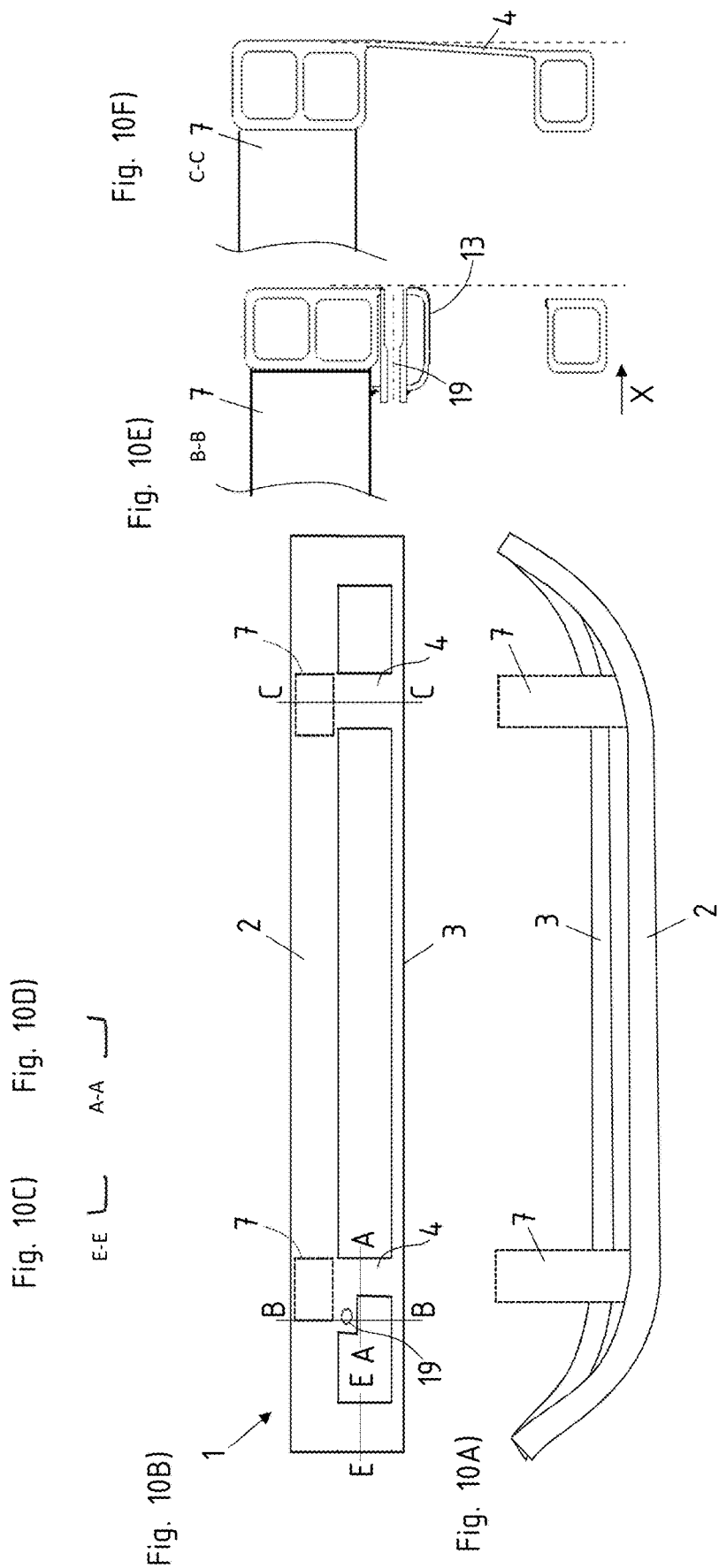

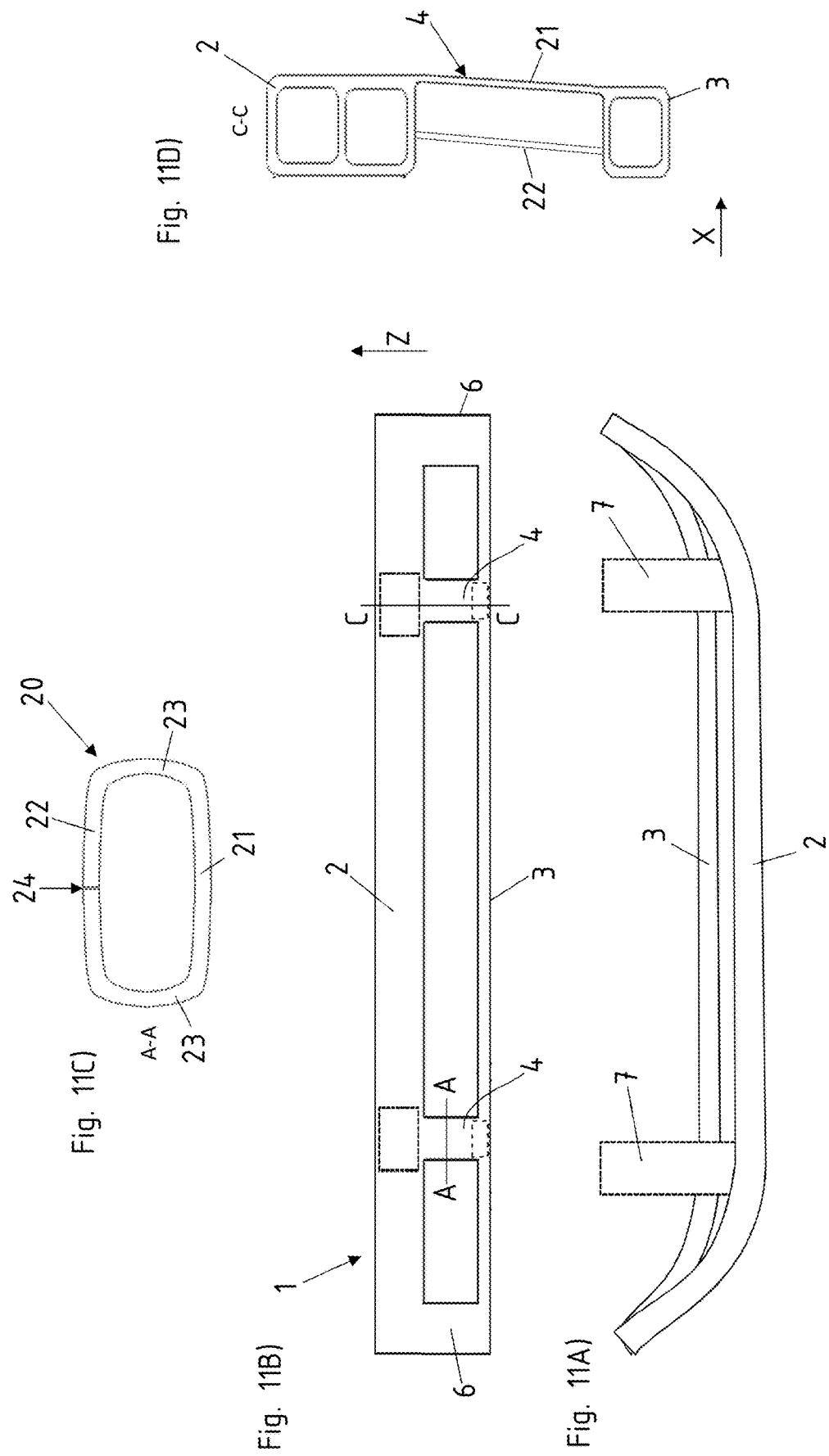

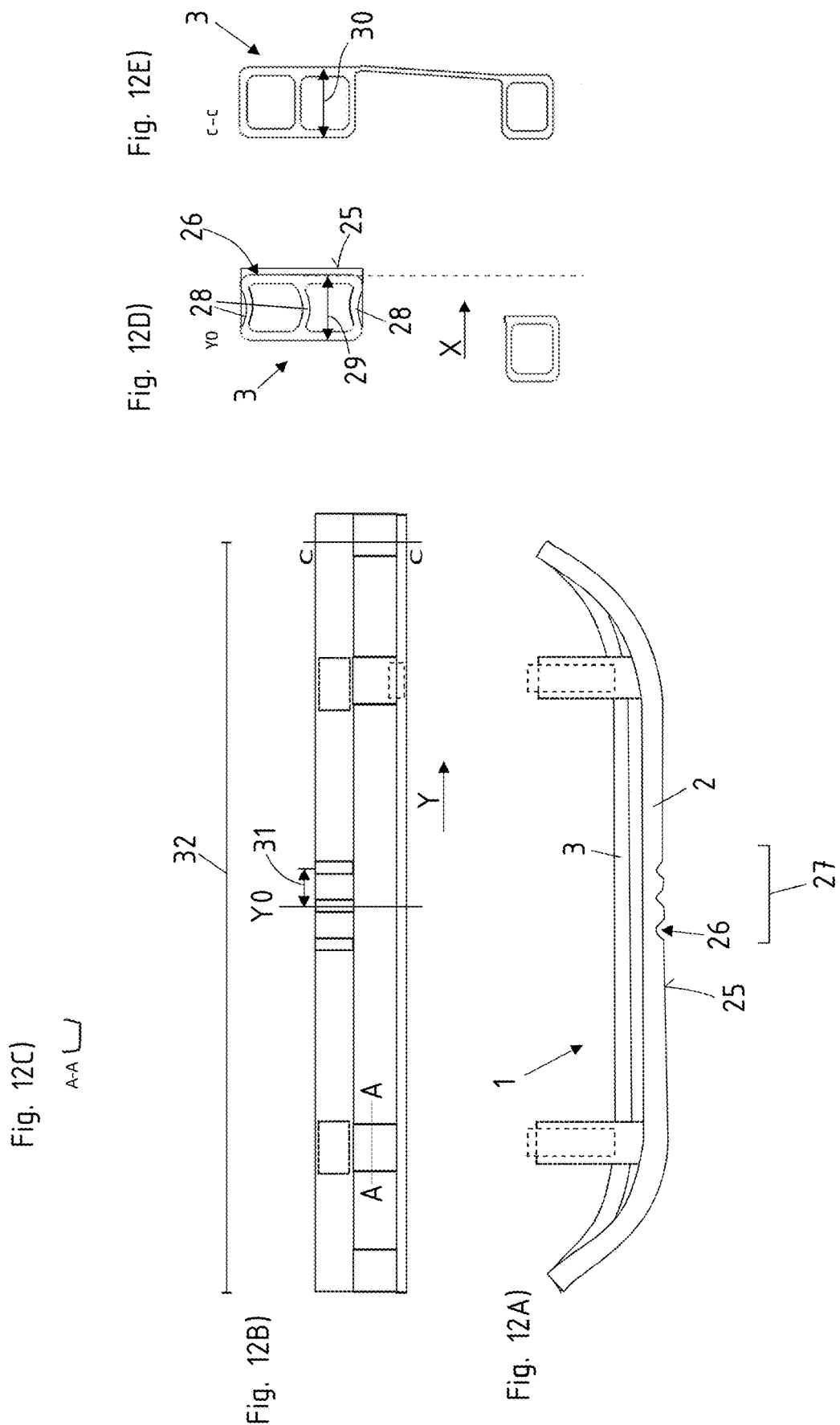

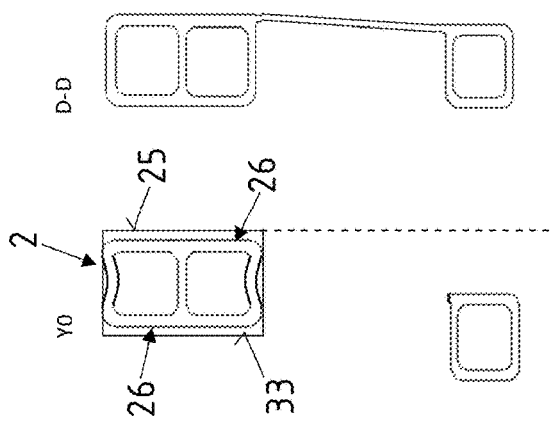
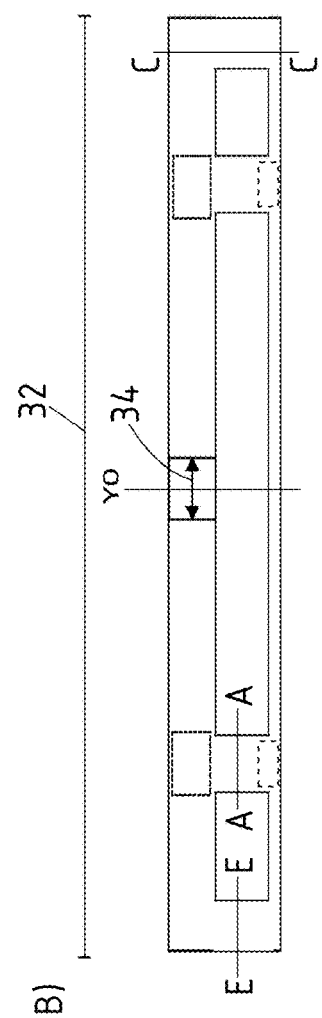
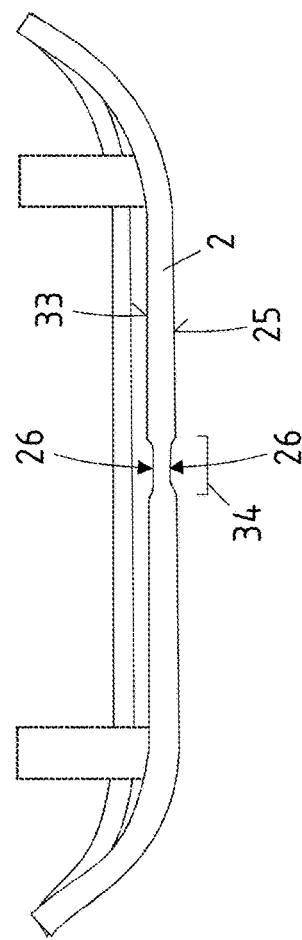

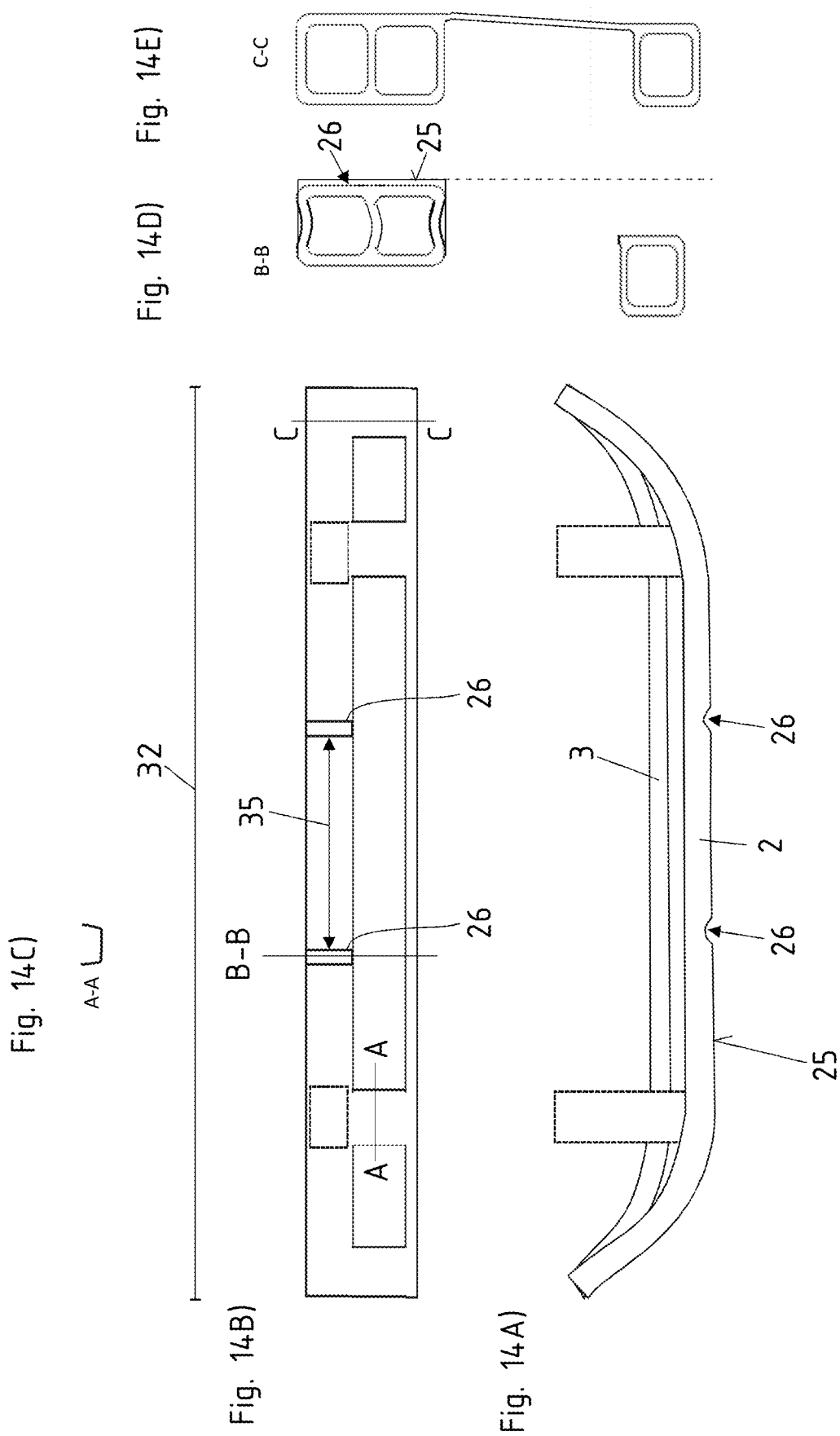

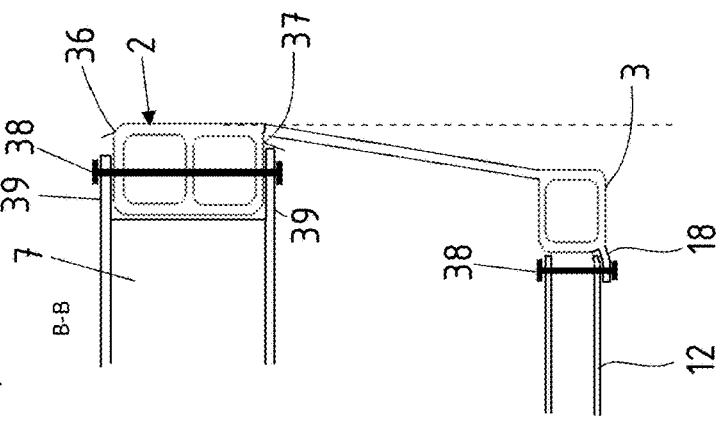
Fig. 15E)
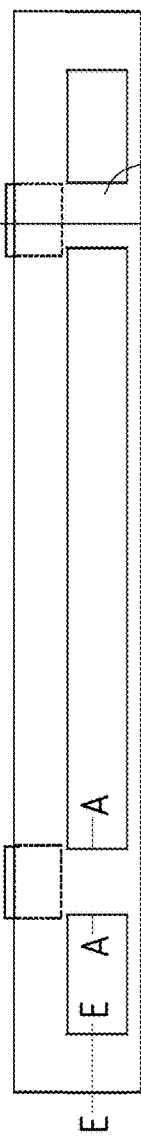
Fig. 15C)  Fig. 15D)
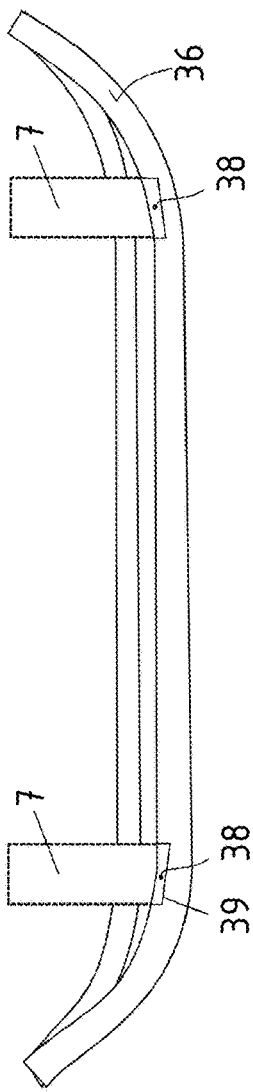
Fig. 15B)
Fig. 15A)

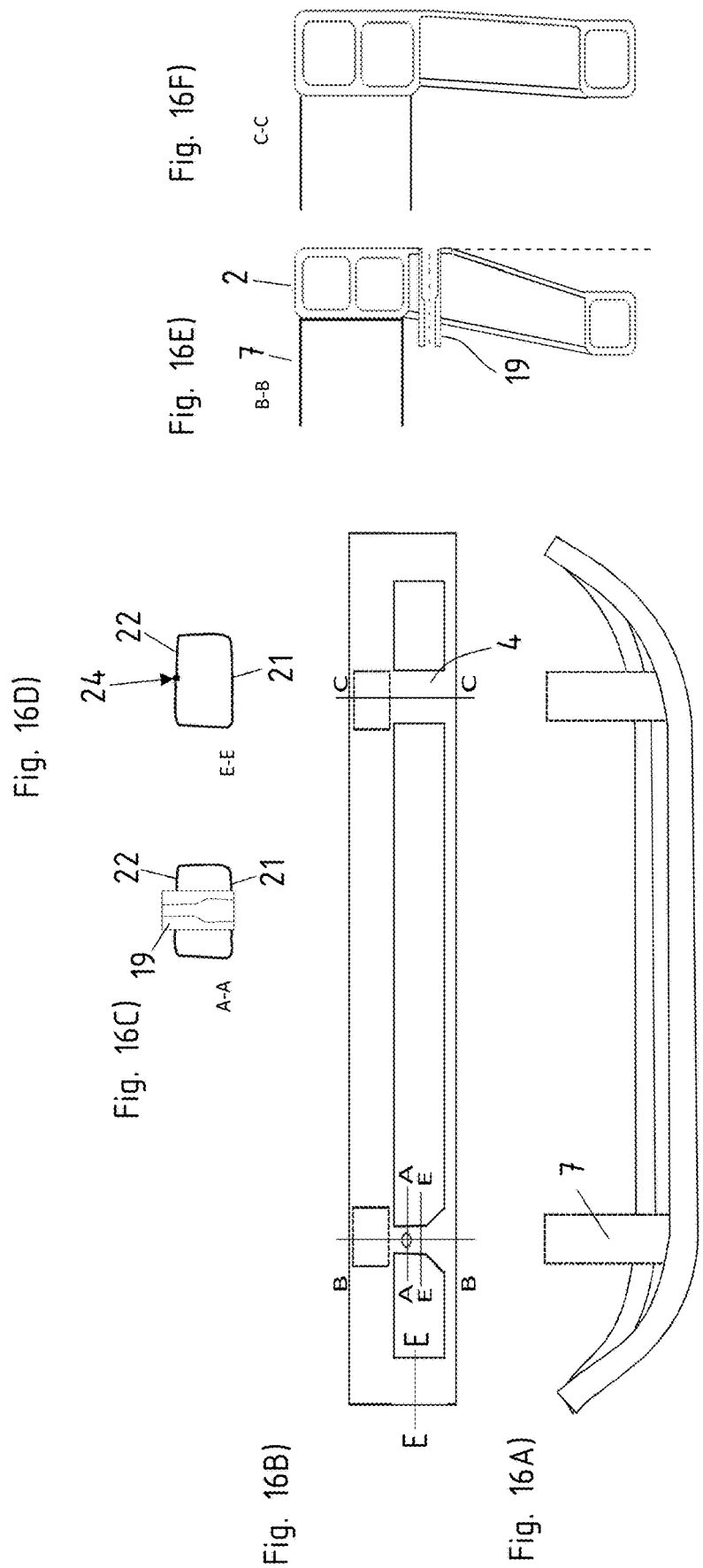

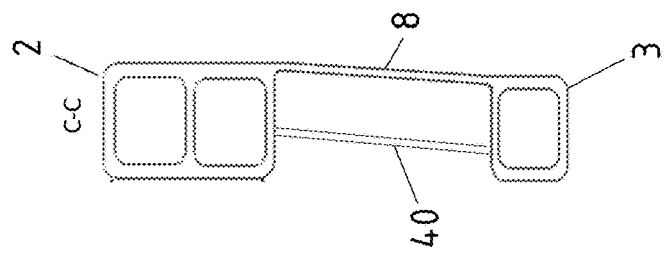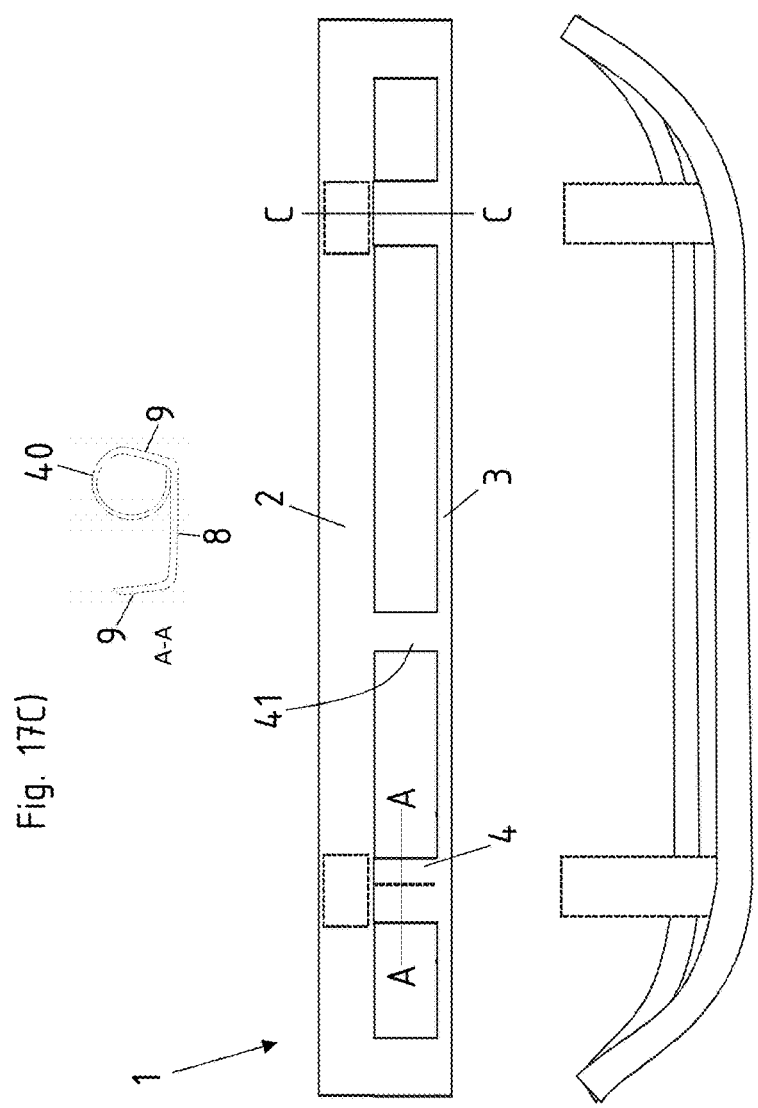

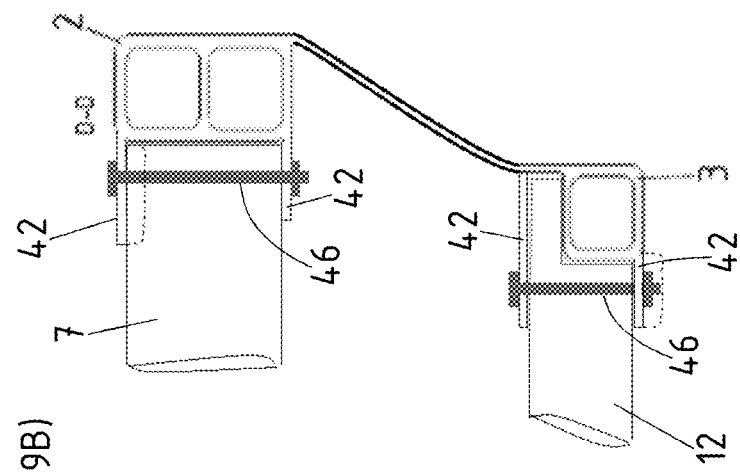
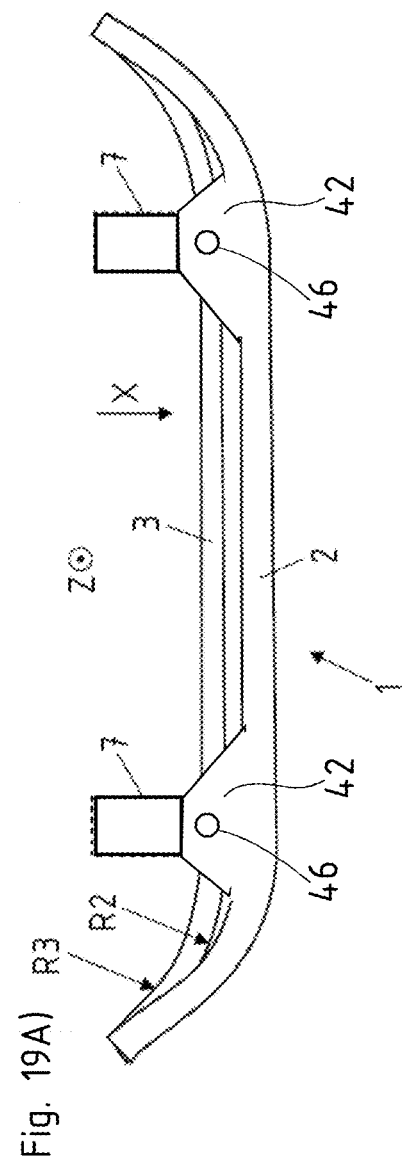
Fig. 19B)
Fig. 19A)

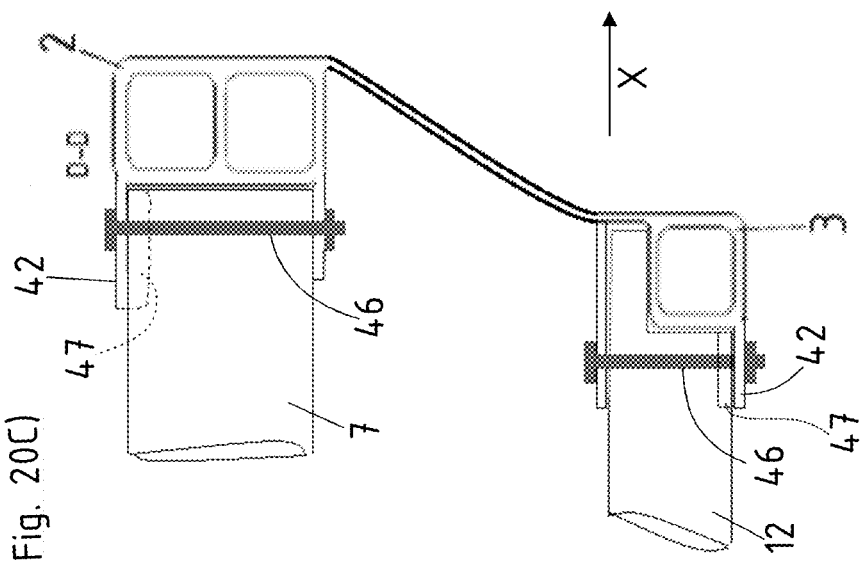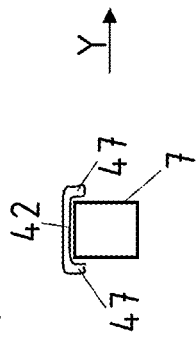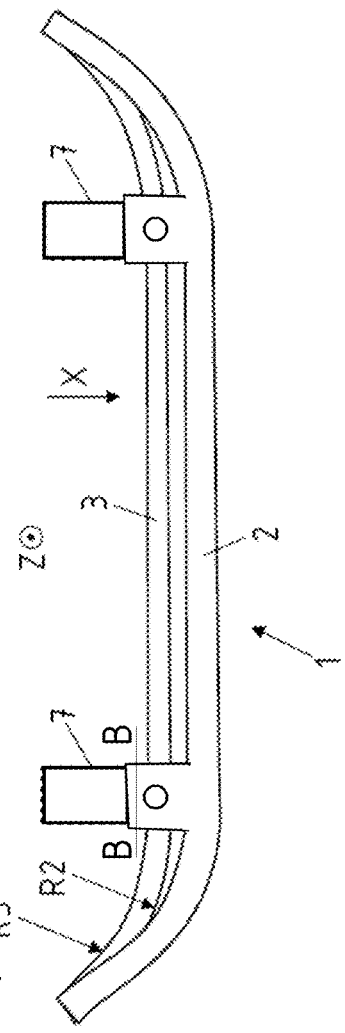

BUMPER ARRANGEMENT WITH ADDITIONAL SUPPORT

RELATED APPLICATION(S)

The present application claims priority of German Application Number 102021 102365.3 mailed Feb. 2, 2021, the disclosure of which is hereby incorporated by reference herein in its entirety.

FIELD

The present disclosure relates to a bumper arrangement for a motor vehicle.

BACKGROUND

Motor vehicles have front-side or end-side bumper arrangements. In the case of a vehicle crash or a rear-end collision or even an impact against an object, two tasks are fulfilled by such a bumper arrangement. Firstly, a cross member is present. The cross member has a sufficient stiffness to prevent a corresponding object or a motor vehicle from penetrating too far into the front region or end region. Thus a potential point impact, for example on a post, is transmitted by the cross member to a large part of the motor vehicle width.

A second task which is fulfilled by a bumper arrangement is the conversion of crash energy into deformation work and thereby a corresponding reduction in the impact energy. To this end, one respective cross member is coupled via crash boxes to the motor vehicle. To this end, the crash boxes are arranged between a central region and an end region of the cross member relative to the motor vehicle transverse direction, thus in each case arranged between a third and a quarter of the length in the outer region of the cross member relative to the motor vehicle width. The crash boxes are thus generally coupled to the longitudinal members of the motor vehicle. In the case of an impact, the crash boxes fold, for example, in the manner of a concertina and thus covert crash energy into deformation work.

SUMMARY

The object of the present disclosure is to set forth a bumper arrangement which has improved crash behavior, such as in the MPDB crash test.

The aforementioned object is achieved according to the disclosure by a bumper arrangement for a motor vehicle.

The bumper arrangement for a motor vehicle has an upper main cross member, which is coupled via crash boxes to the motor vehicle, and a lower auxiliary cross member. The main cross member and the auxiliary cross member are coupled together via vertical struts. The auxiliary cross member is able to optionally be supported on the crash boxes. The auxiliary cross member is able to be supported on the motor vehicle via separate longitudinal members or crash boxes of a lower load path.

According to the disclosure, the bumper arrangement is characterized in that the main cross member and/or the auxiliary cross member and/or the vertical element is or are supported on the crash box and/or on a longitudinal member of the motor vehicle via at least one additional support element oriented in the direction of the motor vehicle. The support element in this case is configured in one piece and in a single material with the main cross member or the auxiliary cross member or with the vertical element itself.

Regarding the support on the crash box or the longitudinal member, a coupling is carried out by a positive connection, for example a screwing or riveting. Alternatively or additionally, a material connection is able to be selected, thus a bonding or a welding. A composite of light metal and steel is able to be coupled in the case of a positive coupling method. A material coupling method, for example a welding, is able to be used when substantially the same materials are used, for example steel to steel or light metal to light metal.

By means of the additional support option it is possible to provide further load paths. In the case of an accident or crash, the additional support element is able to deform and thus additionally convert crash energies into deformation work and thus dissipate the crash energy.

In the case of an upper impact beam the actual support on the crash box is able to thus be implemented above and below the crash box. In the case of a vertical element, a lateral support is able to be implemented on the crash box. In this case, the additional support element is thus arranged obliquely relative to the vehicle vertical direction so as to be oriented from the vertical element toward the crash box.

The main cross member and the auxiliary cross member are able to run at least in some sections in a curved manner about the vertical axis, wherein the main cross member and the auxiliary cross member, however, have different radii of curvature from one another.

This is combined with an offset of the auxiliary cross member in the motor vehicle longitudinal direction in the direction toward the vehicle. In the case of a bumper arrangement which is arranged on a vehicle front, therefore, the auxiliary cross member is arranged offset to the rear in the motor vehicle longitudinal direction.

Additionally or alternatively, the auxiliary cross member has a central section which is offset relative to the vertical direction, such as upwardly or downwardly.

By means of the aforementioned measures, according to the disclosure a frontal crash with lateral overlap is distributed to the main cross member and also the auxiliary cross member. The intrusion forces into the vehicle front are thus distributed in an improved manner.

By means of the options which result from the curvatures of the main cross member and auxiliary cross member or which result from the offset of the auxiliary cross member to the main cross member in the motor vehicle longitudinal direction, the desired crash reactions regarding the dissipation of energy are able to be adjusted according to the requirements of the respective motor vehicle class which is provided with the bumper arrangement, such that the crash performance which is respectively required on the part of the manufacturer and in statutory terms is achieved.

The main cross member and the auxiliary cross member in combination with the vertical struts and the additional support elements are produced in one piece and in a single material. To this end, within the context of the disclosure, the bumper arrangement is able to be produced as a press-formed component from a steel alloy. Thus a shell component is able to be produced by forming technology from a blank. The main cross member and auxiliary cross member have a profiled, a U-shaped or C-shaped, or even hat-shaped, cross section. Optionally, one respective locking plate is able to be placed on the main cross member or auxiliary cross member relative to the longitudinal direction, if required only in some sections.

Alternatively, according to the disclosure the main cross member and the auxiliary cross member are produced from an extrusion profile in one piece and in a single material from a light metal alloy. To this end, a profile is able to be extruded which has a plurality of hollow chambers which are connected via a web and which is compact in cross section. This is then treated by forming technology and cutting technology so that a main cross member is configured to be arranged at the top relative to the vertical direction and an auxiliary cross member is configured to be arranged therebelow. The corresponding curvatures are able to be produced by a further treatment using bending technology. The connection which is configured via the vertical struts is a connecting web which remains between the profiles. The remaining material is able to be removed by cutting technology.

In this case, the support element is shaped so as to protrude from the plane of a rear wall of the cross member or the auxiliary cross member or one of the vertical struts in the direction of the crash box or extends from this plane at an angle in the direction of the vehicle.

The vertical struts have in turn a profiled, a U-shaped, C-shaped or hat-shaped, cross section. A front web is arranged facing away from the vehicle. By this measure, the main cross member and the auxiliary cross member are coupled together in a rigid manner which in turn increases the crash performance.

In a further variant, an indentation is present in the main cross member, such that an initial deformation takes place in the case of loading in the longitudinal direction. The indentation is provided on a front wall of the main cross member relative to the motor vehicle longitudinal direction. Two or more indentations are able to be present. The two indentations are spaced apart from one another in the motor vehicle transverse direction. However, the two indentations are arranged symmetrically to one another relative to a central plane in the motor vehicle transverse direction. Firstly an initial deformation is able to takeplace by means of the indentation or indentations on the front face, such that the bumper arrangement in each case is correspondingly deformed only by half relative to the motor vehicle transverse direction. An initial introduction of force, thus the initial impact force due to a deformation of the main cross member into itself, is also able to dissipate a first peak of crash energy.

Further, the auxiliary cross member is coupled to the crash boxes. Alternatively or additionally, the auxiliary cross member is coupled to additional longitudinal members or crash boxes, which in turn are supported on the motor vehicle. Thus the auxiliary cross member provides a further load path which in turn introduces the forces occurring in the case of a front impact more uniformly and thus respectively to a locally smaller extent into the motor vehicle, whereby in turn the overall crash performance is increased.

By the additional vertical elements which are configured in one piece as vertical struts. Firstly a greater stiffening of the entire bumper arrangement is produced in the region of the outer ends. In the case of a frontal crash, however, the following further effect is achieved. In the case of a frontal crash, the additional vertical element is displaced to the rear in the motor vehicle longitudinal direction and thus initially strikes the wheel housing and with further deformation also the vehicle wheel. In the case of a crash of greater intensity, the vehicle wheel would be then deformed or displaced on the side sills of the motor vehicle located therebehind, so that an additional load path is provided. In the case of a crash of lower or average intensity, however, an additional load path is initially provided by the support on the wheel housing or on the wheel, and then in turn via the wheel suspension, for example on the subframe, so that the impact force is not exclusively introduced via the main cross member and the crash box but additionally via the auxiliary cross member and in turn additionally via a support on the wheel housing or wheel.

BRIEF DESCRIPTION OF THE DRAWINGS

Further advantages, features, properties and aspects of the present disclosure form the subject of the following description.

These figures serve for simple understanding of the disclosure. In the figures:

FIG. 4A-FIG. 4D show a second variant in front view and cross-sectional views according to the disclosure, FIG. 6A-FIG. 6D show a third variant in front view and cross-sectional views according to the disclosure, FIG. 7A-FIG. 7F show a fourth variant in plan view, front view and cross-sectional views according to the disclosure, FIG. 8A-FIG. 8F show a fifth variant in plan view, front view and cross-sectional views according to the disclosure, FIG. 9A-FIG. 9F show a sixth variant in plan view, front view and cross-sectional views according to the disclosure, FIG. 10A-FIG. 10F show a seventh variant in plan view, front view and cross-sectional views according to the disclosure, FIG. 11A-FIG. 11D show an eighth variant in plan view, front view and cross-sectional views according to the disclosure, FIG. 12A-FIG. 12E show a ninth variant in plan view, front view and cross-sectional views according to the disclosure, FIG. 13A-FIG. 13F show a tenth variant in plan view, front view and cross-sectional views according to the disclosure, FIG. 14A-FIG. 14E show an eleventh variant in plan view, front view and cross-sectional views according to the disclosure, FIG. 15A-FIG. 15E show a twelfth variant in plan view, front view and cross-sectional views according to the disclosure, FIG. 16A-FIG. 16F show a thirteenth variant in plan view, front view and cross-sectional views according to the disclosure, FIG. 17A-FIG. 17D show a fourteenth variant in plan view, front view and cross-sectional views according to the disclosure, FIG. 19A and FIG. 19B show a sixteenth variant in plan view and cross-sectional view according to the disclosure, FIG. 20A-FIG. 20C show a seventeenth variant in plan view and cross-sectional views according to the disclosure.

DETAILED DESCRIPTION

Figure 1:
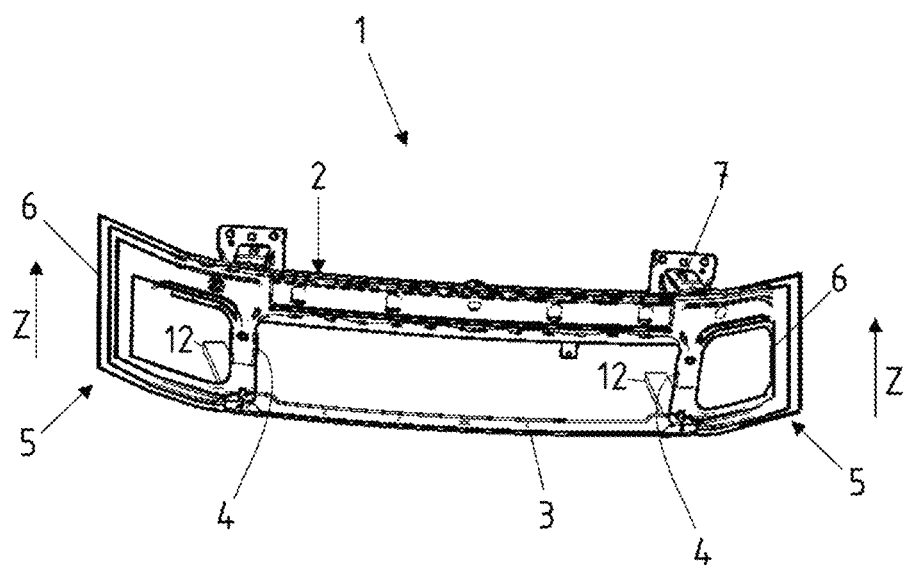
FIG. 1 shows a perspective view of a bumper arrangement according to the disclosure.

In the figures the same reference numerals are used for the same or similar components, even if a repeated description is omitted for reasons of simplicity.

FIG. 1 shows a bumper arrangement 1 according to the disclosure for a motor vehicle, not shown in more detail. The bumper arrangement 1 has an upper main cross member 2 and an auxiliary cross member 3 located therebelow relative to the motor vehicle vertical direction Z. The main cross member 2 and the auxiliary cross member 3 are coupled together via vertical struts 4, 6. A vertical element 6 which also connects together the main cross member and auxiliary cross member 2, 3 is provided in the respective end regions 5. The main cross member 2 is coupled via crash boxes 7 to the motor vehicle, not shown in more detail. The vertical struts 4 are able to be supported on the crash boxes 7, not shown in more detail. The auxiliary cross member 3 is supported on the motor vehicle via lower crash supports 12.

FIG. 2A-FIG. 2F show a variant of the present disclosure. The bumper arrangement 1 according to the disclosure is shown with the main cross member 2 arranged at the top and the auxiliary cross member 3 arranged therebelow relative to the vertical direction. The main cross member 2 is coupled via crash boxes 7 to the motor vehicle, not shown in more detail. For example, the crash boxes 7 are coupled to the front face of one respective longitudinal member of the motor vehicle, not shown in more detail. The auxiliary cross member 3 is supported on the motor vehicle via lower crash supports 12.

According to FIG. 2A in the motor vehicle longitudinal direction X the auxiliary cross member 3, which is arranged at the bottom relative to the motor vehicle vertical direction Z, is configured to be set back relative to the main cross member 2, at least in a substantially large part of the central section, thus between the crash boxes 7, and optionally also in the respective edge region. In the case of an impact, therefore, initially a contact is made with the main cross member 2. After deformation of the main cross member 2 then an additional deformation of the auxiliary cross member 3 also takes place. According to FIG. 2A the respective radii of curvature is visible, with which the main cross member 2 or the auxiliary cross member 3 run in a curved manner around the vertical axis Z, are different from one another. The radius of curvature of the main cross member 2 in this case is smaller than the radius of curvature of the auxiliary cross member 3. This means that the main cross member 2 is configured to have a greater curvature than the radius of curvature of the auxiliary cross member 3. Relative to the motor vehicle longitudinal direction, by the cooperation with the offset of the auxiliary cross member 3 in the direction of the vehicle, is able to be initially ensured by the different radii of curvature that a barrier or pressing object initially strikes against the main cross member 2 and only later against the auxiliary cross member 3. The main cross member 2 and the auxiliary cross member 3 are coupled together via the respective vertical strut 4. According to FIG. 2F a cross section with the cutting line A-A of the vertical strut 4 is shown. This is configured to be U-shaped in cross section. A front web 8 is oriented away from the motor vehicle. Limbs 9 bent away from the web 8 are oriented to the rear. Thus the vertical strut 4 is configured to be stiffened. Due to the web 8 which is oriented to the front, an impact is initially produced with an object. Further vertical elements 6 are arranged in the respective end region. A section through the vertical elements 6 is shown in FIG. 2E according to the cutting line E-E. The vertical element 6 itself is configured to be L-shaped in cross section, wherein a forwardly oriented web 8 and a limb 9 bent back therefrom to the rear are also configured here.

In this case the web 8 also initially strikes against an impacting object or a barrier. The crash boxes 7 in this case are arranged in the motor vehicle vertical direction above the vertical struts 4. A vertical section is shown in FIG. 2C according to the cutting line B-B. The main cross member 2 is shown as a two-chamber hollow profile and the auxiliary cross member 3 as single-chamber hollow profile. Also shown according to the cutting line C-C in FIG. 2D is the end region 5, according to which the main cross member 2 and the auxiliary cross member 3 are coupled together via a vertical element 6. The vertical element 6 is produced in one piece and in a single material with the main cross member 2 and the auxiliary cross member 3, for example by an extrusion process from a light metal alloy, specifically an aluminum alloy. The web 8 or the vertical element 6 which is not present in FIG. 2C according to the cutting line B-B, has thus been removed by cutting technology.

Figure 3:
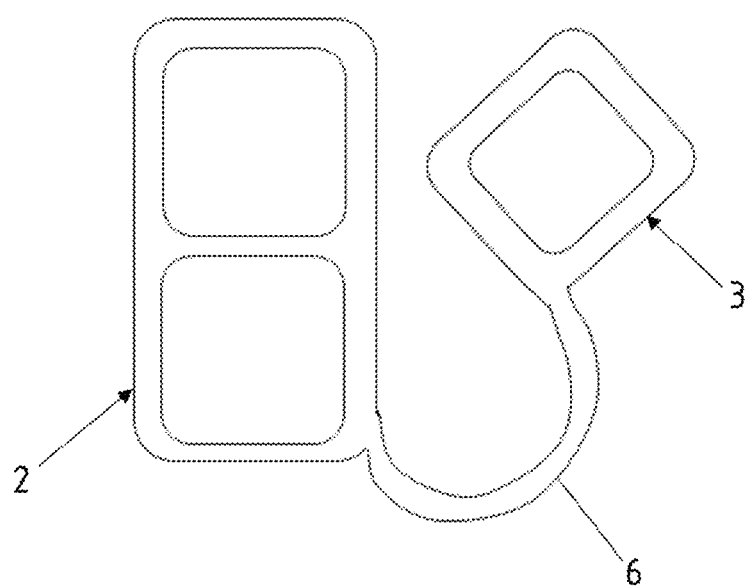
FIG. 3 shows a cross-sectional view through an extrusion profile according to the disclosure.

FIG. 3 shows such an extrusion profile in cross section. In this case, a two-chamber hollow profile is able to be identified for forming the subsequent main cross member 2 and a single-chamber hollow profile for forming the subsequent auxiliary cross member 3 are coupled together via a vertical element 6. In a forming step, not shown in more detail, the extrusion profile, which is initially produced in this manner, is firstly treated by forming technology or bending technology such that the profile is flattened so that, relative to the vertical direction, the main cross member 2 is arranged above and the auxiliary cross member 3 is arranged therebelow oriented in the vertical direction, and the web 8 forms the vertical element. Initially, however, a compact profile is able to thus be extruded in cross section.

Figure 2:
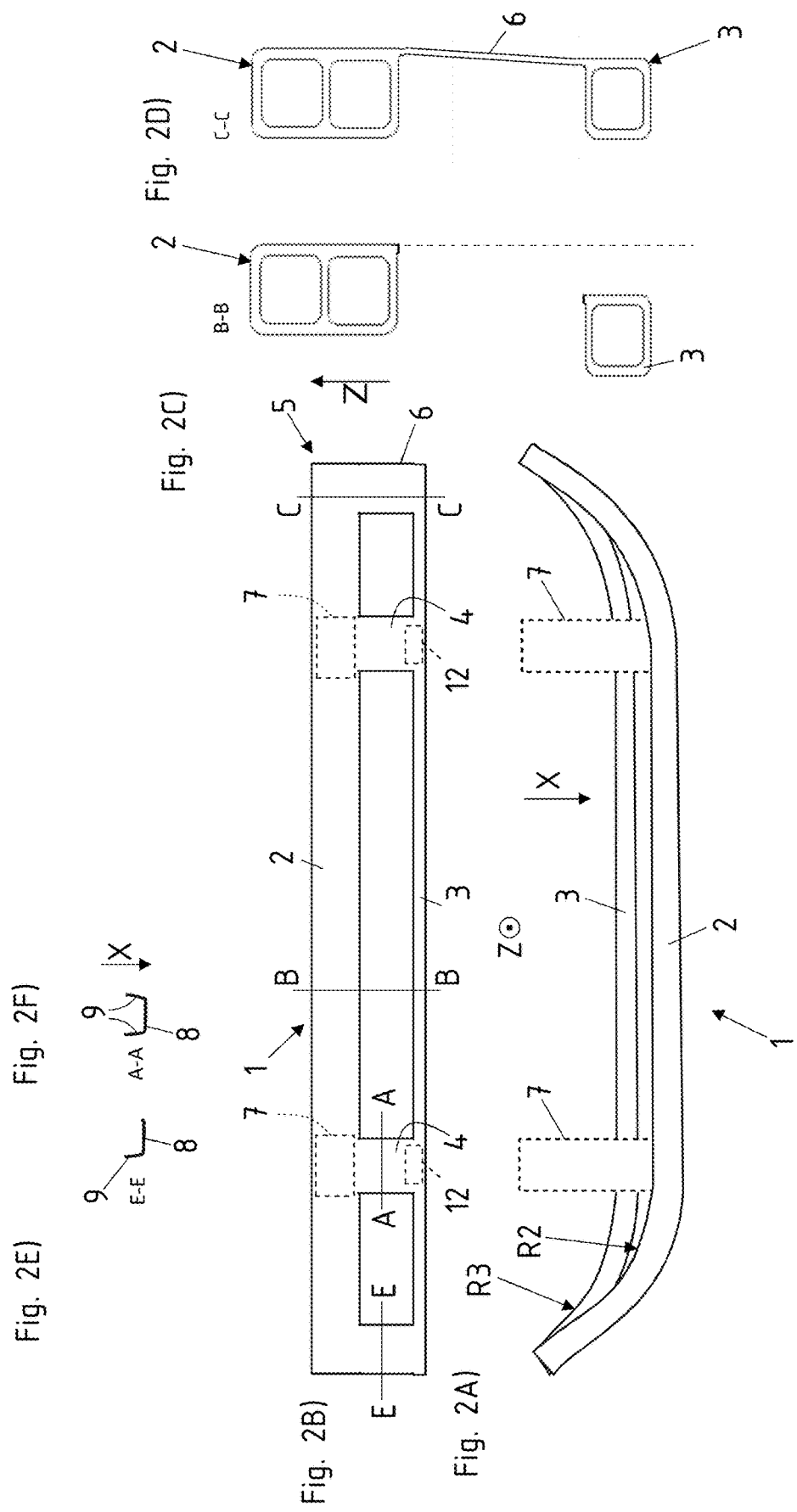
FIG. 2A-FIG. 2F show a first variant according to the disclosure of a bumper arrangement according to the disclosure in plan view, front view and different sectional views.

FIG. 4A-FIG. 4D show a variant similar to FIG. 2. In this case, however, a central section 10 of the auxiliary cross member 3 is offset upwardly in the vertical direction. A height difference is able to be compensated by this offset, depending on the crash requirement, for example for achieving a bumper-to-bumper test or even a pedestrian impact test which has to be additionally performed. Corresponding air ducts is able to be used for cooling elements or the like, not shown in more detail, located therebehind.

According to FIG. 4B and FIG. 4C the auxiliary cross member 3 is able to be arranged at the bottom in the motor vehicle vertical direction Z, compared to the main cross member 2, has an offset upwardly in the central section relative to the vertical direction. As is already possible in FIG. 2F, the auxiliary cross member 3 has an offset to the rear relative to the motor vehicle longitudinal direction X. This offset, however, does not have to be configured and the offset in the central section is able to be configured alone. This relates to the height offset in the motor vehicle vertical direction, which then might be configured without an offset in the motor vehicle longitudinal direction.

Figure 5:
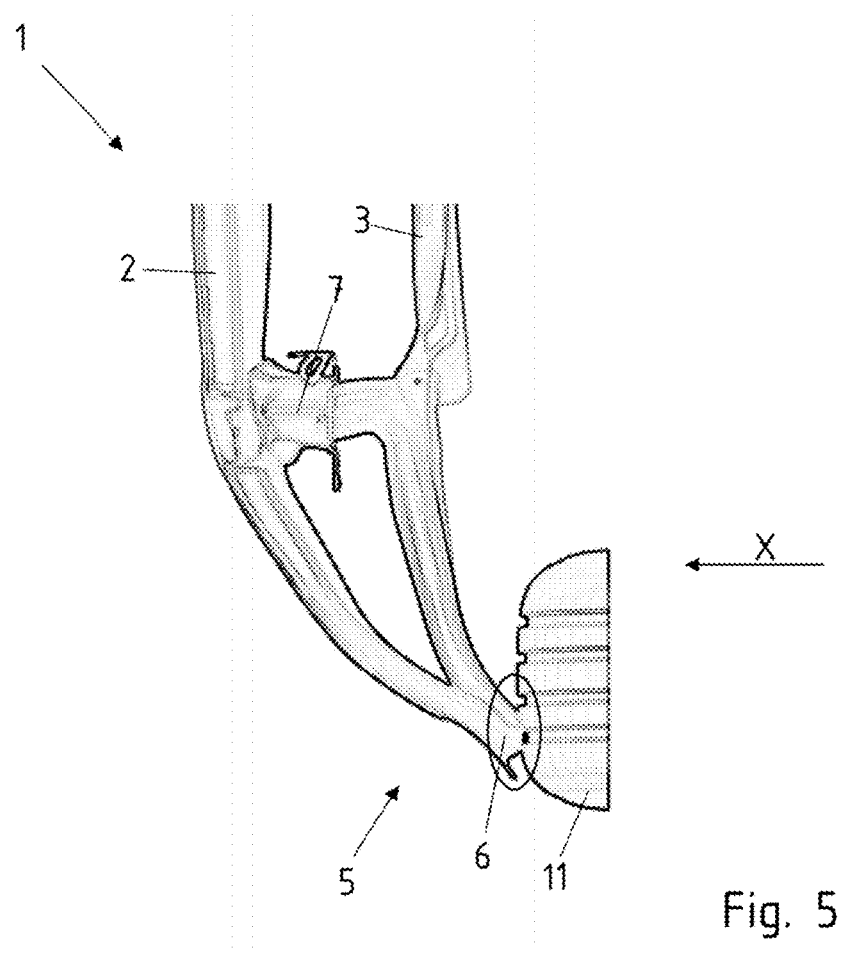
FIG. 5 shows a crash scenario of a bumper arrangement according to the disclosure in plan view.

FIG. 5 shows the bumper arrangement 1 in a view from above in the case of a crash which has already taken place. The crash box 7 is able to be identified as already compressed. The main cross member 2 which is arranged at the top and the auxiliary cross member 3 located therebelow in the vertical direction are arranged below. The vertical element 6 in the end region 5 is moved toward a wheel 11 relative to the motor vehicle longitudinal direction. This vertical element is now supported on a wheel 11 with its bent-back limb according to FIG. 2E. Initially, a wheel housing, not shown in more detail, is able to be contacted. Thus a further load path might result via the wheel 11 and, following therebehind in the motor vehicle longitudinal direction, sills not shown in more detail. If no lower crash boxes are present, therefore, the main cross member 2 is not only exclusively introduced into the motor vehicle body via the crash box 7 but also introduced into the motor vehicle body via a second load path, thus via the wheel 11 and the sills located therebehind in the motor vehicle longitudinal direction. A support surface is produced by the vertical element 6 so as to reliably prevent that the wheel 11 is struck in the motor vehicle longitudinal direction and that the wheel 11 migrates downwardly or upwardly due to the rotational connection of the wheel 11 and the crash energy. By means of the high impact surface of the vertical element 6 in combination with the main cross member and auxiliary cross member 2, 3, a secure support is ensured on the wheel 11 relative to the motor vehicle vertical direction. Thus in the case of only the main cross member 2, for example, the situation is avoided that the bumper arrangement 1 is lifted over the wheel 11 and that there would be correspondingly no additional support on the wheel 11 at that point.

FIG. 6A-FIG. 6D show an alternative variant with a bumper arrangement 1 according to the disclosure. This is able to represent a separate inventive idea, but also applied in combination with one or more of the exemplary embodiments according to FIG. 1 to FIG. 5.

A bumper arrangement 1 which also has a main cross member 2 and an auxiliary cross member 3 arranged therebelow in the motor vehicle vertical direction Z is shown according to FIG. 6A. A central section of the auxiliary cross member 3 is able to be arranged downwardly in the vertical direction Z but alternatively, not shown, also offset upwardly. The main cross member 2 and the auxiliary cross member 3 in each case are coupled together via vertical struts 4. In this exemplary embodiment, the respective end regions 5 of the main cross member 2 and the auxiliary cross member 3 are not coupled together again separately via a vertical element 6. This is able to be implemented, but is not shown.

The crash boxes 7 indicated by the dashed line, to which the main cross member 2 is fastened, are however arranged inwardly offset in the motor vehicle transverse direction Y, thus inwardly offset adjacent to the vertical struts 4. Additionally, the auxiliary cross member 3 is supported in the motor vehicle longitudinal direction via one respective additional crash box 12 which is also shown in cross section in FIG. 6C. According to FIG. 6B the cross section of the vertical strut 4 is also configured to be U-shaped with a web 8 oriented to the front and the limbs 9 bent back therefrom.

In the variant of FIG. 6, an additional support element is present on the main cross member 2 and also optionally shown here an additional support element 13 on the auxiliary cross member 3. This additional support element 13 is a piece of material which is configured in one piece and in a single material with the main cross member 2 or auxiliary cross member 3 and which is bent back by bending technology as a type of brace, and in the case of FIG. 6C for the main cross member 2 is arranged below the crash box 7 and is coupled therewith. The auxiliary cross member 3 is bent back upwardly to the rear and thus is coupled to the additional crash box 12. As a result, an additional supporting action is implemented, but also an increase in the impact surface on the front faces 14, 15 of the main cross member 2 and auxiliary cross member 3.

FIG. 7A-FIG. 7F show a further alternative variant of the present disclosure, but alternatively these are able to be combined in any manner with the aforementioned examples. A bumper arrangement 1 which has a main cross member 2 and an auxiliary cross member 3 is disclosed according to FIG. 7A and FIG. 7B. The auxiliary cross member 3 according to the plan view of FIG. 7A is arranged offset to the rear relative to the main cross member 2 in the motor vehicle longitudinal direction. The main cross member 2 is supported via crash boxes 7 on a motor vehicle, not shown in more detail. Vertical struts 4 which connect together the main cross member 2 and the auxiliary cross member 3 are present. These vertical struts 4 are produced in one piece and in a single material with the main cross member 2 and the auxiliary cross member 3 itself as an extrusion component. Vertical elements 6 which connect together the main cross member 2 and the auxiliary cross member 3 are arranged in the end region 5 of the main cross member 2 and auxiliary cross member 3. The main cross member 2 itself is configured as a two-chamber hollow profile and the auxiliary cross member 3 is configured as a single-chamber hollow profile. The vertical strut 4 and the vertical element 6 are configured in a single material and in one piece with the main cross member 2 and the auxiliary cross member 3.

For the adaptation to the above-described variants, in each case an additional part is configured in the vertical strut 4 so that a significantly wider web 8, which is oriented to the front, is produced on the vertical strut 4 according to the cutting line A-A. A limb bent back to the rear is able to be regarded as an additional support element 13. This additional support element 13 is then supported laterally on the crash box 7 located therebehind, shown in FIG. 7A, and coupled thereto. To this end, the additional support element 13 is able to be bent back upwardly and offset, according to FIG. 7E, in the motor vehicle vertical direction Z in order to be supported laterally on the crash box 7. Alternatively conceivable, but not shown, is that relative to the height in the motor vehicle vertical direction Z the crash box 7 extends beyond the actual height of the main cross member 2, thus downwardly in the motor vehicle vertical direction Z the height of the crash box 7 or the arrangement of the crash box 7 has a further extension in the motor vehicle vertical direction Z. The additional support element 13 which is supported laterally on the crash box 7, is thus only bent back laterally and not bent back upwardly in the motor vehicle vertical direction, as shown in FIG. 7E.

FIG. 8 shows a further variant of the present disclosure. FIG. 8A-FIG. 8F show a further variant of the disclosure. This is based substantially on the variant described in FIG. 7.

In addition, however, the additional support is implemented in this case not only on one side on one respective crash box 7 but on both sides of the crash box 7. Therefore, a significantly wider web 8 is produced according to the cutting line A-A shown in FIG. 8C, and a support is implemented respectively on both sides on the crash box 7. FIG. 8 also shows that reinforcing webs protruding from the rear face of the auxiliary cross member 3 are present. These reinforcing webs protruding from the rear face generate an increased moment of resistance against bending about the motor vehicle vertical direction. Thus the auxiliary cross member 3 has a greater stiffness due to the reinforcing webs.

FIG. 9A-FIG. 9F show an alternative variant to FIG. 7. In this case, a number of additional support elements which are supported on the crash boxes 7 are present. These support elements are supported in the motor vehicle transverse direction on the outside on the crash boxes 7. According to the example in FIG. 7, these support elements are supported on the inside on the crash boxes 7. A larger web 8 is also initially produced thereby, in the case of a vertical element 6 according to FIG. 9B and FIG. 9C. According to FIG. 9, the additional support stiffens, the outer end which is prevented from additional buckling or kinking in the direction of the motor vehicle transverse direction due to the oblique support outwardly. In this case, the additional reinforcing webs are optionally also arranged on the rear face of the auxiliary cross member 3.

FIG. 10A-FIG. 10F show a further alternative or additional variant of the present disclosure. In this case, the bumper arrangement 1 is configured once again with a main cross member 2 and an auxiliary cross member 3. These two cross members are coupled together via vertical struts 4. According to the variant, a towing eye 19 is arranged in an additional support element 13. This arrangement is implemented according to the cutting line B-B, shown in FIG. 10E, outside the crash box 7 and outside the main cross member 2. According to the disclosure both the main cross member 2 and the crash box 7 are able to correspondingly deform in the case of a frontal crash, without the towing eye 19 impairing the deformation itself. The towing eye 19 is thus arranged separately from the impact beam and the crash box 7. To this end, a part of the connecting vertical element 6 according to the cutting line C-C of FIG. 10F is able to be used and treated by cutting and bending technology, when the main cross member 2 and the auxiliary cross member 3 are blanks, so that the additional section element is configured, said additional section element then being bent back to the rear in the motor vehicle longitudinal direction in order to create an additional receiving chamber into which a towing eye 19 is then incorporated. The towing eye 19 is able to be welded, for example, in the chamber. The towing eye 19, however, is arranged outside the crash box 7 and outside the main cross member 2 so that this has no effect on the crash performance of the main cross member 2 and the crash box 7 itself.

FIG. 11A-FIG. 11D show a further additional and alternative variant of the present disclosure.

A bumper arrangement 1 comprising a main cross member 2 and an auxiliary cross member 3, which are coupled together via vertical struts 4, is shown here once again. The vertical struts 4 in this case, however, are configured as a hollow profile 20 which is in turn closed in cross section according to the cutting line A-A. These vertical struts thus have a front wall 21 and a rear wall 22 and webs 23 connecting the front wall and rear wall. This results from initially producing the main cross member 2 and the auxiliary cross member 3 together as a one-piece extrusion profile according to the cutting line C-C shown in FIG. 11D. The connection forming the front wall 22 of the vertical strut 4 between the main cross member 2 and the auxiliary cross member 3 is then cut out by cutting technology. Then these are bent back to the rear relative to the motor vehicle longitudinal direction X in order to form the connecting webs 23 and closed so as to be oriented facing toward one another on the rear wall 22. At the point of abutment 24 a welding is able to be carried out in order to produce an additional reinforcement. By the configuration of a hollow profile 20 as a vertical strut 4 a greater stiffness is achieved between the main cross member 2 and the auxiliary cross member 3 and a support of the auxiliary cross member 3 is achieved without additional supports on a longitudinal member of the auxiliary cross member 3.

FIG. 12A-FIG. 12E show a further variant. In principle, the same properties are present as shown in FIG. 2. In addition to FIG. 2, however, here at least one but a plurality of trigger beads 26 are configured in a central section of the main cross member 2 in the front wall 25. In the case of a corresponding impact, the trigger beads 26 serve to produce an initial deformation only on one side of the bumper arrangement 1. The trigger beads 26 are configured by indenting the main cross member 2. In this region, the front wall 25 is indented so that the connecting webs 28 of the two-chamber hollow profile shown here are compressed. Thus a smaller depth 29 results in the motor vehicle X direction relative to the depth 30 of the main cross member 2, and for example the main cross member is produced as an extruded profile. This is also able to be identified further in FIG. 12B and FIG. 12E.

In this case, three trigger beads 26 are arranged. One trigger bead is arranged centrally in the motor vehicle transverse direction Y. The two further trigger beads are arranged adjacent thereto. The spacing 31 of the trigger beads 26 to one another is less than 10%, less than 5% of the total length 32 of the main cross member 2 in the motor vehicle transverse direction Y.

FIG. 13 shows in a modification of FIG. 12 a central trigger bead 26 on the front wall 25 of the main cross member 2. A further trigger bead 26 is arranged on the rear wall 33 of the main cross member 2. The trigger bead 26 here is configured to be wider and has a width 34 of between 1 and 10% of the total length of the main cross member 2. In this case, the respective trigger beads 26 on the front and rear face of the main cross member 2 are also generated by corresponding indentations. In this case, in turn the connecting webs 28 are also correspondingly shaped.

FIG. 14A-FIG. 14E show a further variant of the bumper arrangement 1 according to the disclosure. In this case, two trigger beads 26 respectively spaced apart from one another are shaped on the main cross member 2. This shaping is carried out by an indentation. The two trigger beads 26 are spaced apart at a distance 35 which corresponds to 10 to 30% of the total length 32 of the main cross member 2. The two trigger beads 26 are symmetrically spaced apart from one another from a central longitudinal plane of the main cross member 2.

FIG. 15 shows a fastening option which is able to be applied to all of the above-mentioned bumper arrangements 1.

In this case, the crash box 7 is configured such that on an upper face 36 overlaps the upper face 36 and also on a lower face 37 overlaps the main cross member 2. Then there is a central bolt 38 or a fastening screw which couples the main cross member 2 to the crash box 7 passing through said main cross member. For the overlap, corresponding extensions or tongues 39 are provided by which the crash box 7 overlaps the main cross member 2. is shown in the sectional view B-B in FIG. 15E. The auxiliary cross member 3 also has a rearward reinforcing web. This reinforcing web serves at the same time for coupling to an additional crash box 7. A bolt 38 which passes through the reinforcing web and thus couples the auxiliary cross member 3 to the additional crash box 12 is also provided here.

FIG. 16A-FIG. 16F show a further variant. This corresponds substantially to the variant according to FIG. 11. In this case, the respective vertical strut 4 is also configured with the front wall 21 and the rear wall 22. At the point of abutment 24 these walls are welded together. However, a towing eye 19, which passes through the front wall and the rear wall of the vertical strut 4, is arranged in addition to the vertical strut 4. The towing eye 19 is arranged according to the cutting line in FIG. 16E below the main cross member 2 and also below the crash box 7. In the case of a frontal crash, therefore, the crash performance of the main cross member 2 or crash box 7 is not impaired due to the towing eye 19.

FIG. 17A-FIG. 17C show an alternative variant to the variant of FIG. 11. In this case, the bumper arrangement 1 is configured such that the vertical struts 4 which connect the main cross member 2 to the auxiliary cross member 3, the cross-sectional view in FIG. 17C, not only have a front web and limbs protruding therefrom but at least in the region of a limb are also configured to be folded over or rolled over. As a result, in cross section a closed hollow profile 20 results and thereby increased stiffness of the vertical strut 4.

The folded-over or rolled-over part 40 is able to be treated only by forming technology. However, the folded-over or rolled-over part 40 is also able to be coupled, for example, to the web or limb, for example by bonding or welding. Overall, an increased stiffness of the vertical strut 4 results.

Additionally, a further aspect of the disclosure is also shown between the upper main cross member 2 and lower auxiliary cross member 3, which is able to be transferred to all other exemplary embodiments. At least one additional vertical strut 41 is shown. This is also configured in one piece and in a single material with the upper main cross member 2 and the lower auxiliary cross member 3. Further additional vertical struts 6 are able to be configured between the main cross member 2 and the auxiliary cross member 3. This increases the stiffness.

Figure 18B:
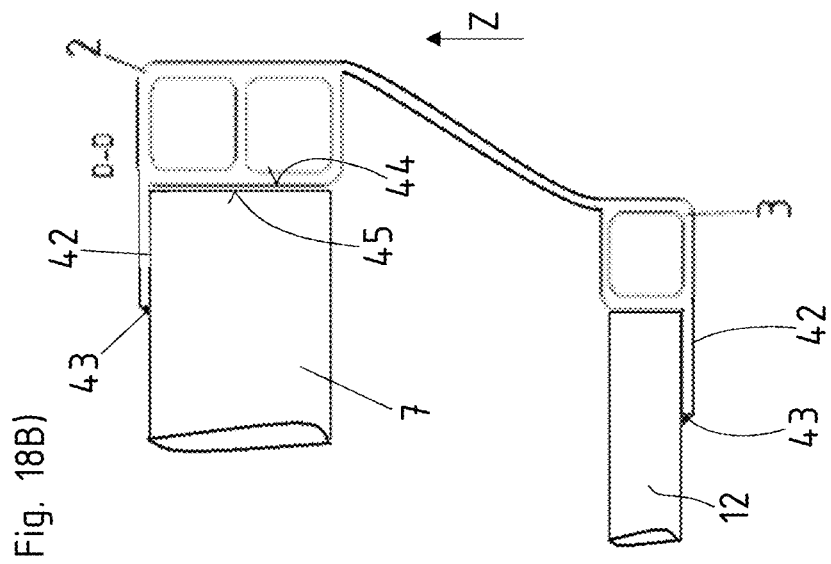
FIG. 18A and FIG. 18B show a fifteenth variant in plan view and cross-sectional view according to the disclosure.
Figure 18A:
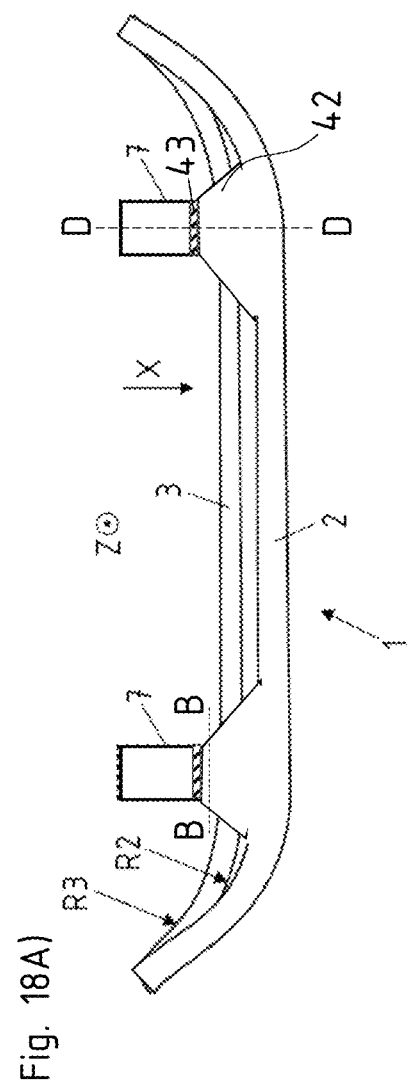

FIG. 18 shows an alternative variant as to how the crash boxes 7 is able to be coupled to the bumper arrangement 1. In this case, the crash box 7 and the additional crash support 12 in each case are brought with a front face 44 as far as the rear wall 45 of the main cross member 2. The same applies to the lower additional crash support 12 which is positively applied to the rear wall of the auxiliary cross member 3. So that these cross members are now coupled, one respective flange 42 is provided which protrudes on the rear wall both from the main cross member 2 and from the auxiliary cross member 3 and at the same time overlaps the crash box 7 or the additional crash support 12. These cross members are then coupled by a material connection by a weld seam, for example in the form of fillet weld. This variant permits a further positive coupling in addition to the material coupling, so that the bumper arrangement 1 is positively held in the motor vehicle vertical direction Z.

FIG. 19 shows a similar variant in which, however, the coupling is not carried out by a material connection by a weld seam but via a fastening bolt 46. Here in each case two flanges are also provided, said flanges overlapping or receiving in the manner of a fork the respective box 7 or the auxiliary cross member 3 via an additional crash support 12.

FIG. 20A-FIG. 20C show a further variant. This is similar to FIG. 19 with one respective fastening bolt 46 which receives the crash box 7 or the additional support. Additionally here, however, a fork-like receiver is also shown in the motor vehicle transverse direction Y according to FIG. 20B. The crash box 7 on the upper face is overlapped by the flange. The flange also encompasses with external limbs 47 the crash box 7 to the side. The additional crash support 12 also has this feature. Additionally, this crash support encompasses with a part the lower auxiliary cross member 3 and is brought with its front end against the front face of the auxiliary cross member 3 in the motor vehicle longitudinal direction X.

The coupling options described in each case in FIG. 18-FIG. 20 is able to be transferred to all of the exemplary embodiments without departing from the scope of the disclosure.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper arrangement for a vehicle, comprising:
   an upper main cross member, wherein the upper main cross member is able to be coupled via crash boxes to the vehicle; and
   a lower auxiliary cross member, wherein the upper main cross member and the lower auxiliary cross member are integrally formed with vertical struts,
   the vertical struts are supported on at least one of the crash boxes or on a flange plate on a longitudinal member via at least one additional support element oriented in a vertical direction of the vehicle,
   the upper main cross member is supported on the lower auxiliary cross member via the at least one additional support element oriented into a longitudinal direction of the vehicle,
   the at least one additional support element is one piece and in a single material with at least one of the upper main cross member, the lower auxiliary cross member, or the vertical struts, and
   the upper main cross member and the lower auxiliary cross member comprise a light metal alloy.

2. The bumper arrangement according to claim 1, wherein the at least one additional support element of the upper main cross member is to at least one of a side or below the crash boxes.

3. The bumper arrangement according to claim 1, wherein the upper main cross member and the lower auxiliary cross member comprise an extrusion profile that is integrally formed.

4. The bumper arrangement according to claim 1, wherein the vertical struts comprise at least one of a U-shaped, C-shaped or hat-shaped cross section.

5. The bumper arrangement according to claim 1, wherein the upper main cross member has an indentation configured to be initially deformed when a force or load is applied in a longitudinal direction of the vehicle.

6. The bumper arrangement according to claim 1, wherein the lower auxiliary cross member is coupled to the crash boxes.

7. The bumper arrangement according to claim 1, wherein a first outer end of the upper main cross member is coupled to a second outer end of the lower auxiliary cross member via one respective additional vertical element and the vertical struts are configured to support a front wheel in the longitudinal direction of the vehicle.

8. The bumper arrangement according to claim 1, wherein the upper main cross member and the lower auxiliary cross member extend in a curved manner about a vertical axis, wherein a first radius of curvature the upper main cross member is different from a second radius of curvature of the lower auxiliary cross member.

9. The bumper arrangement according to claim 1, wherein the lower auxiliary cross member is positioned with respect to at least one of the following: set back relative to the upper main cross member, oriented toward the vehicle in the vehicle longitudinal direction, or the lower auxiliary cross member has a central section which is offset relative to the vertical direction.

10. The bumper arrangement according to claim 1, wherein the upper main cross member and the lower auxiliary cross member comprise a steel alloy.

11. The bumper arrangement according to claim 1, wherein the lower auxiliary cross member is supported on the vehicle on at least one of additional crash boxes or the at least one additional support element.

12. The bumper arrangement according to claim 1, wherein the upper main cross member and the at least one additional support element are integrally formed.

* * * * *